(No Model.)

A. DUNN.
RAKE.

No. 458,270. Patented Aug. 25, 1891.

Witnesses.
A. B. Monkhouse
L. P. Abell

Inventor:
Adam Dunn
by Fetherstonhaugh & Co.

THE NORRIS PETERS CO., PHOTO-LITHO., WASHINGTON, D. C.

UNITED STATES PATENT OFFICE.

ADAM DUNN, OF GALT, CANADA, ASSIGNOR OF TWO-THIRDS TO SELENA DIETRICH AND FRED DOUGLAS PALMER, OF SAME PLACE.

RAKE.

SPECIFICATION forming part of Letters Patent No. 458,270, dated August 25, 1891.

Application filed November 28, 1890. Serial No. 372,772. (No model.)

*To all whom it may concern:*

Be it known that I, ADAM DUNN, gardener, of the town of Galt, in the county of Waterloo, in the Province of Ontario, Canada, have invented certain new and useful Improvements in Rakes, of which the following is a specification.

My invention relates more particularly to rakes designed for garden or lawn use; and the object of the invention is to design a cheaply-constructed and efficient rake which will expeditiously remove mown grass, standing weeds, or other like refuse; and it consists, essentially, of forming the head of the rake out of one piece of sheet metal, which is concaved throughout its length to form a temporary receptacle for collecting the refuse of the lawn, the teeth of the rake being formed similarly to saw-teeth and the sides of each tooth being beveled on the under side to form cutting-edges, as hereinafter more particularly explained.

Figure 1:
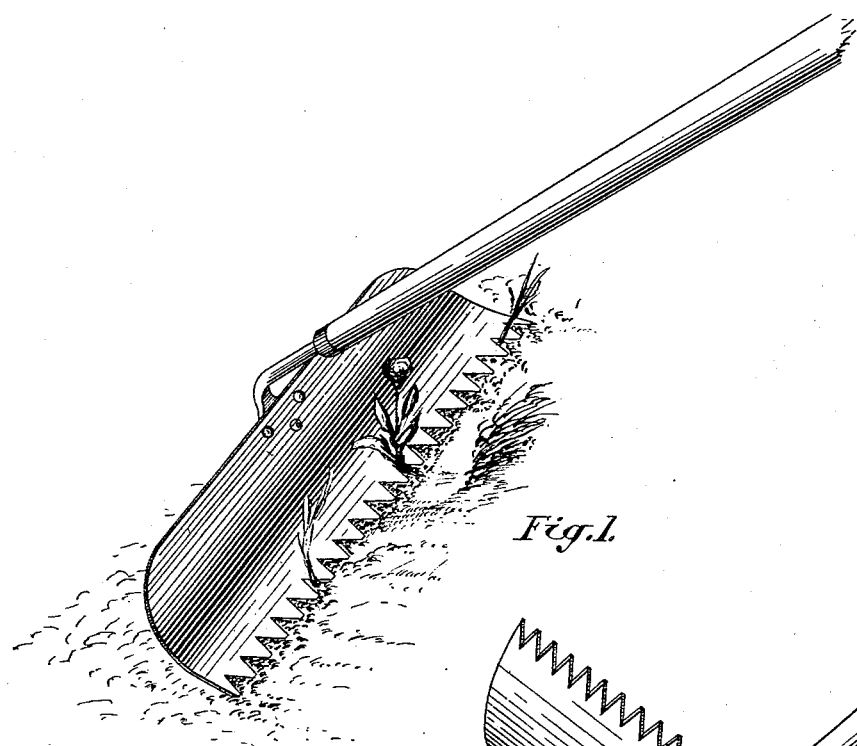
Figure 2:
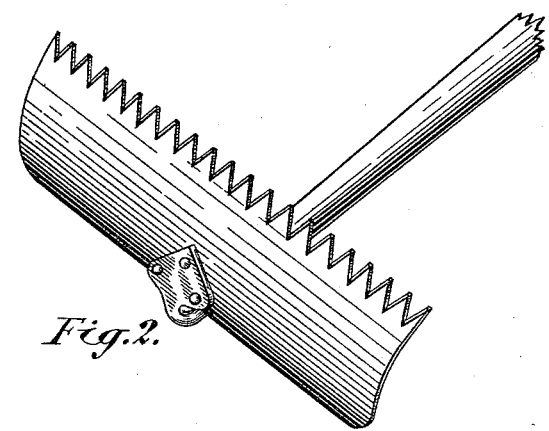

Figure 1 is a perspective view of my rake in position for use. Fig. 2 is a perspective view showing my rake reversed.

A is the head of the rake, which is stamped or otherwise formed out of a single sheet of metal. The head of the rake A is concaved along its length to form a receptacle for grass and refuse, thus providing a ready means for removing the same. The shape of the teeth of the rake may of course be stamped out at the same time as the body of the head. A cutting-edge is afterward filed on the under side of the teeth, each tooth being beveled to its top edge, as indicated in Fig. 2. The head is attached to the handle at such angle that when the rake is held in position ready for use the lower edge of the head with the teeth carried thereby will be substantially parallel to the surface to be raked. It will thus be seen that while the teeth will gather up all loose grass and other refuse matter they will not catch in and tear the sod, and as the teeth are beveled upwardly to a sharp cutting-edge they will sever and remove any weeds which are left standing by the mower. The head of the rake is riveted to the flared-out bottom end of the shank B. The upper end of the shank B is inserted into the handle, as shown.

From this description it will be seen that a rake made in accordance with my invention may be manufactured very cheaply, and will prove of great utility in not only removing grass and other refuse of a like kind, but also in cutting weeds or stalks which would otherwise remain standing and give an unsightly appearance to the lawn.

I am aware that it is not new to provide a rake with a toothed cutting-edge, and that prior to my invention rakes have been made of a single piece of sheet metal toothed on the edge and rakes have been shown with elongated teeth with these teeth curved from their front ends toward the rear; but my invention distinguishes from these various forms of rakes in that I form the body portion of sheet metal concaved, the front edge of which is provided with teeth to cut down the grass and weeds, while the concaved sheet-metal body provides a receptacle to gather the material thus cut and prevent it from being scattered over the lawn.

What I claim as my invention is—

A rake or hoe provided with a concaved body portion of sheet metal, the front edge of said body portion being provided with cutting-teeth, the material cut thereby being gathered and held in the concaved body portion, substantially as described.

ADAM DUNN.

Witnesses:
W. S. WEICHEL,
R. BARRIE.